United States Patent [19]

Bunting et al.

[11] Patent Number: 4,885,795

[45] Date of Patent: Dec. 5, 1989

[54] HOSPITAL DIGITAL DATA TRANSFER SYSTEM

[75] Inventors: Earl L. Bunting, Westport; Michael Kovis, Fairfield, both of Conn.

[73] Assignee: Bunting, Inc., Bridgeport, Conn.

[21] Appl. No.: 118,211

[22] Filed: Nov. 6, 1987

[51] Int. Cl.⁴ .......................... H04H 1/02; H04L 25/40
[52] U.S. Cl. ............................................ 455/5; 455/6; 375/36; 370/29
[58] Field of Search ................ 455/3, 4, 5, 6; 375/36; 370/29; 340/825.06, 310 R

[56] References Cited

U.S. PATENT DOCUMENTS

| | | | |
|---|---|---|---|
| 3,105,873 | 10/1963 | Winston et al. ............... | 455/5 X |
| 3,492,418 | 1/1970 | Tanner . | |
| 3,517,120 | 6/1970 | Bunting . | |
| 3,534,161 | 10/1970 | Friesen et al. . | |
| 3,614,318 | 10/1971 | Klose ............... | 375/36 X |
| 3,699,250 | 10/1972 | Bunting . | |
| 3,718,762 | 2/1973 | Nezu et al. ............ | 375/36 |
| 3,946,159 | 3/1976 | Fay . | |
| 3,959,772 | 5/1976 | Wakaga et al. ............ | 375/36 |
| 4,031,543 | 6/1977 | Holz ........................ | 455/5 |
| 4,143,239 | 3/1979 | Hultman et al. ............ | 375/36 |
| 4,327,249 | 4/1982 | Rademaker ............ | 375/36 |
| 4,360,828 | 11/1982 | Briggs, Jr. et al. ............ | 455/3 |
| 4,443,815 | 4/1984 | Hempell . | |
| 4,630,313 | 12/1986 | Damoci . | |

FOREIGN PATENT DOCUMENTS 103438  3/1984  European Pat. Off. .
2022963  12/1979  United Kingdom .

OTHER PUBLICATIONS

Circuit Diagram, Feb. 24, 1974.

*Primary Examiner*—Robert L. Griffin
*Assistant Examiner*—Ralph E. Smith
*Attorney, Agent, or Firm*—Maurice M. Klee

[57] ABSTRACT

A digital data transfer system for transferring baseband digital data between a central location and a patient's room is provided. The system employs the existing coaxial cable network found in hospitals and other institutions. The coaxial cable carries power from a DC power source to the patient's television receiver or other device. Digital data is addressed and transmitted from the central location to the individual patient's room on the coaxial cable by temporarily disconnecting the DC power source from the coaxial cable for each bit which is to be transferred (source switching) and detecting, in the patient's room, the interruption in the flow of DC current through the cable. Digital data is transmitted from the patient's room back to the central location on the same single coaxial cable by temporarily disconnecting the load, e.g., the patient's television receiver or other device, from the coaxial cable for each bit which is to be transferred back (load switching) and detecting, at the central location, the interruption in the flow of DC current through the cable. A storage capacitor is placed in parallel with the load to provide power for the load while the flow of DC current is interrupted. The system can readily achieve transmission rates on the order of 38 kilobaud and above.

21 Claims, 3 Drawing Sheets

HOSPITAL DIGITAL DATA TRANSFER SYSTEM

BACKGROUND OF THE INVENTION

1. Field of the Invention

This invention relates to the transfer of baseband digital data in a hospital environment, and, in particular, to a low cost, efficient, and reliable system for transferring such data among and between central processors and processors located at the beds of individual patients.

2. Description of the Prior Art

The increasing use of computers and microprocessors in hospitals has led to a need for efficient and effective means for transferring digital data between different locations in the hospital. In particular, there has developed a need for two-way digital communication with a patient in his bed over existing coaxial cables. Such communication can, for example, be used to remotely monitor the patient, to request and receive information from the patient, e.g., order entry from the patient's bed, daily menu selections, and the like, to control and monitor the patient's environment, e.g., room lighting, air conditioning, door release, bed controls, smoke detectors, and the like, and to control and monitor the entertainment services and prescription services available to and used by the patient, e.g., forced tuning of TV channels, remote readout of the TV channel being watched at the patient's location, TV channel lockout, adding or skipping of TV channels, and the like.

A possible approach for providing the desired data transfer capability at each patient's bed would be to use a dedicated pair of conductors for each bed. Although this approach might be practical for new hospitals and for some existing hospitals, it is obviously expensive and, for existing hospitals, installation would involve a major interruption of on-going hospital activities. Also, for many existing hospitals, there is insufficient space in existing electrical conduits to add additional wiring. Accordingly, for these hospitals, in addition to the basic wiring, more conduits would also have to be added.

In an attempt to deal with the wiring problem, efforts have been made to transmit digital data on the coaxial cable network which hospitals normally use to carry RF television signals to the television receivers at each patient's bed. This cable network has in the past been adapted to provide DC power to the patient's television set. See Bunting, U.S. Pat. No. 3,699,250.

The approach generally considered to date has been to add additional RF bands to the existing bands already on the cable to carry the digital data. See, for example, European Patent Publication No. 103,438. The inventors of the present invention have worked with this approach and have developed prototype systems employing such additional RF bands. Surprisingly, the added RF bands approach has been found to be significantly more expensive to implement in practice and less reliable in use than the baseband digital data transfer system of the present invention. Also, the RF approach was found to suffer more attenuation than the present system in conducting digital signals over long distances and to be less noise immune than the present system.

The use of frequency-coded and pulse-coded control signals, as well as DC control signals, to activate selected equipment or serve a "nurse call" function has been disclosed in various patents. For example, Friesen et al., U.S. Pat. No. 3,534,161, discloses the use of frequency-coding or pulse-coding to connect the audio portion of a patient's television to a nurse's station. Fay, U.S. Pat. No. 3,946,159, discloses a nurse call system using DC control voltages of different magnitudes. Bunting, U.S. Pat. No. 3,517,120, discloses a nurse call system using a 100 kilohertz control signal. See also Tanner, U.S. Pat. No. 3,492,418; Damoci, U.S. Pat. No. 4,630,313; and U.K. Patent Application Ser. No. 2,022,963.

Along these same lines, Bunting, Inc., the assignee of the present invention, has in the past used interruption of the flow of DC current in a coaxial cable leading to a patient's television set as a control signal for controlling, inter alia, the position of a patient's bed. See also Hempell, U.S. Pat. No. 4,443,815, which discloses a system for detecting tampering with a cable TV system by sensing an interruption of the DC path through the cable.

In the former Bunting system, a coaxial cable carrying RF television signals and DC power for the patient's television set was supplied to the patient's hospital room. The cable was passed through a decoder circuit which was designed to sense interruptions in the flow of DC current in the cable. The decoder circuit was connected to a relay bank which determined the position of the patient's bed. From the decoder circuit, the cable was passed through an encoding circuit which interrupted the flow of DC current through the cable a preselected number of times at a preselected rate depending on the bed position selected by the patient. Finally, the cable was connected to the patient's television set, where it provided RF signals and DC power.

In operation, the patient would press a button on his television set corresponding to the position he desired for his bed, the pressing of the button would cause the encoder to generate a series of DC current interruptions corresponding to the selected button, and the interruptions would cause the appropriate relays to be activated to move the bed into the position selected by the patient.

Significantly, with regard to the present invention, the foregoing systems were concerned with the communication of simple control signals, not with the two-way transmission of streams of digital data at high baud rates. In addition, none of these systems addressed the problem of distinguishing between data being received at a station and data being sent from that station.

SUMMARY OF THE INVENTION

In view of the foregoing state of the art, it is an object of the present invention to provide an efficient, reliable, and low cost system for transferring baseband digital data at high baud rates between diverse locations in hospitals, hotels, motels, schools, apartment houses, and similar buildings which have been wired with coaxial cable.

It is an additional object of the invention to provide such a data transfer system which can be readily used with coaxial cable systems wherein the cable also carries RF television signals and DC power for television sets.

It is a further object of the invention to provide baseband digital data transfer systems which can serially transmit data through a coaxial cable in two directions and which can distinguish between data being transmitted and data being received.

To achieve the foregoing and other objects, the invention provides a baseband, 2-way, digital data transfer system comprising:

(a) a DC voltage source;
(b) a load;
(c) a direct current path between the DC voltage source and the load comprising:
  (i) a coaxial cable having a central conductor which has a first end and a second end:
  (ii) a first end conductive path for connecting the DC voltage source to the first end of the central conductor; and
  (iii) a second end conductive path for connecting the load to the second end of the central conductor;
(d) a first end switch, e.g., a DC pass transistor, in the first end conductive path having an open state in which the flow of DC current from the DC voltage source to the load is interrupted and a closed state in which the flow of DC current is uninterrupted:
(e) a first end bit processor for receiving baseband digital bits from, for example, a central computer and switching the first end switch into its open state for a period of time corresponding to the duration of each bit:
(f) a second end switch in the second end conductive path having an open state in which the flow of DC current from the DC voltage source to the load is interrupted and a closed state in which the flow of DC current is uninterrupted;
(g) a second end bit processor for receiving baseband digital bits from, for example, a remote microprocessor and switching the second end switch into its open state for a period of time corresponding to the duration of each bit;
(h) a first end bit generator for sensing an interruption in the flow of DC current through the first end conductive path and generating a baseband digital bit in response thereto; and
(i) a second end bit generator for sensing an interruption in the flow of DC current through the second end conductive path and generating a baseband digital bit in response thereto.

In certain preferred embodiments, the coaxial cable carries RF signals between its first and second ends in both directions, the load is a television receiver, the coaxial cable carries DC power to the television receiver, and the system includes a storage capacitor in parallel with the television receiver for supplying power to the receiver during times when the direct current path from the DC power source to the receiver is interrupted through the opening of either the first end switch or the second end switch.

In other preferred embodiments, the system inhibits the first end bit generator from generating bits in response to the opening of the first end switch and similarly inhibits the second end bit generator from generating bits in response to the opening of the second end switch.

In additional preferred embodiments, the system includes short circuit and open circuit sensors, as well as a temperature sensor for monitoring the temperature of the first end switch. In connection with these embodiments, the system also preferably limits the rate at which charging current is supplied to the storage capacitor during startup or resetting of the system so as to avoid erroneous triggering of the short circuit sensor due to high inrush current flows into the storage capacitor.

In further preferred embodiments, a plurality of remote processors are connected to a central processor through baseband digital data transfer systems of the above type. For these embodiments, the connection of a particular remote processor to the central processor is established through the use of addressable switches which connect the central processor to the first end bit processor and first end bit generator associated with the particular remote processor to which or from which data is to be transferred.

The accompanying drawings, which are incorporated in and constitute part of the specification, illustrate the preferred embodiments of the invention, and together with the description, serve to explain the principles of the invention.

DESCRIPTION OF THE PREFERRED EMBODIMENTS

Figure 1:
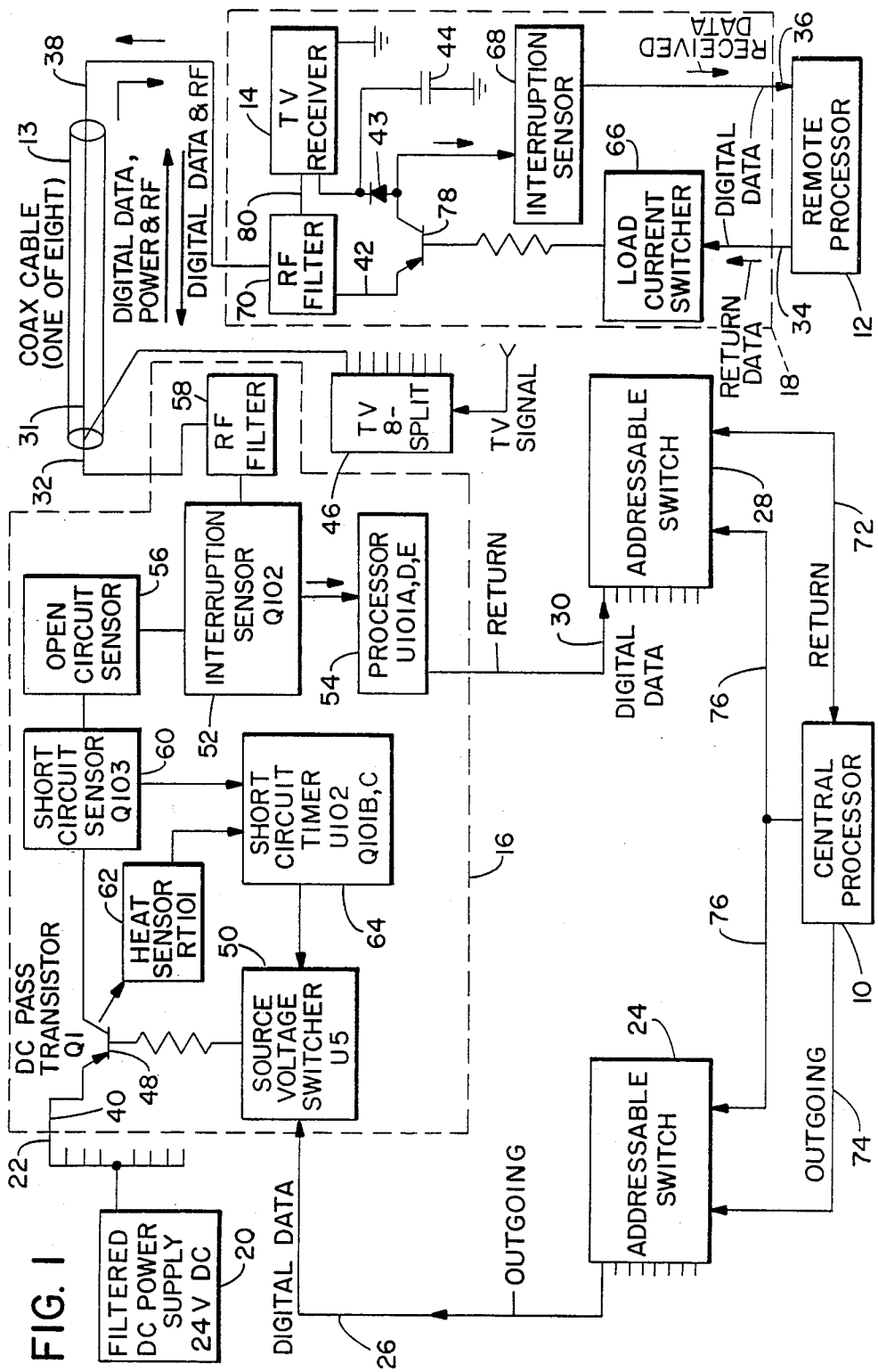
FIG. 1 is a schematic diagram showing the overall structure of a baseband, serial, digital data distribution and processing system employing the digital data transfer system of the present invention.

With reference now to the figures, wherein like reference characters designate like or corresponding parts throughout the several drawings, there is shown in FIG. 1 a baseband digital data distribution system constructed in accordance with the present invention for use in a hospital or similar building which has been wired with coaxial cable.

For purposes of illustration, it is assumed in FIG. 1 that central processor 10 communicates with eight remote processors 12. FIG. 1 shows the components connecting the central processor to one of the eight remote processors. Identical components are used between the central processor and each of the other remote processors. The eight remote processors could, for example, be located in different rooms or at the bedsides of different patients in a hospital ward. More or less processors, of course, could be connected to the central processor. Also, the data distribution system of FIG. 1 could be part of a hierarchial distribution system wherein digital data flows between central processors, hospital wings, hospital wards, and processors in the rooms of individual patients.

In FIG. 1, it is further assumed that there is a television receiver 14 associated with each remote processor and that in addition to transferring baseband data, coaxial cable 13 provides DC power and RF signals to the receiver. The RF signals are supplied to the cable through TV 8-split 46 which receives its input from the hospital's master antenna system. If desired, coaxial cable 13 can also be used to carry RF signals from the patient's room to a nurse's station, central monitoring station, or the like. Television receiver 14 functions as a load for the baseband data transfer system and will typically draw 200 milliamps when off and 1,000 milliamps when on. Other loads, such as, a simple resistor, can be used in place of the television receiver.

As shown in FIG. 1, the baseband digital data transfer system comprises a first end portion 16 and a second end portion 18. First end portion 16 is connected to DC power supply 20 by conductor 22, to addressable switch 24 by conductor 26, to addressable switch 28 by conductor 30, and to first end 32 of central conductor 31 of coaxial cable 13. Second end portion 18 is connected to remote processor 12 by conductors 34 and 36 and to second end 38 of the central conductor of coaxial cable 13.

When neither first end portion 16 nor second end portion 18 is transferring digital data, DC current flows from DC power supply 20 to television receiver 14 by means of the direct current path consisting of first end conductive path 40 in first end portion 16, central conductor 31, and second end conductive path 42 in second end portion 18. When the direct current path is interrupted during the transferring of baseband digital data, storage capacitor 44 supplies power to the television receiver. For a storage capacitor having a capacitance of approximately 2,000 microfarads and a television receiver which draws approximately 1,000 milliamps when on and which has an internal capacitance of approximately 1,000 microfarads, data transfer rates on the order of 4,800 baud can be easily achieved without any noticeable effect on the performance of the television receiver. Transmission rates as high as 38,000 baud have been tested with the system again with no degradation of television performance.

First end portion 16 of the data transfer system includes: (1) DC pass transistor 48, which has an open state in which the flow of DC current through conductive path 40 is interrupted and a closed state in which the flow of DC current is uninterrupted; (2) source voltage switcher 50, which receives baseband digital bits from addressable switch 24 and switches transistor 48 into its open state for the durations of the received bits: and (3) interruption sensor 52 and processor 54 which sense interruptions in the flow of DC current through conductive path 40 and generate a baseband digital bit in response to each interruption. As discussed in detail below, the operation of source voltage switcher 50 and processor 54 are coordinated so that digital bits are not generated on conductor 30 in response to interruptions in conductive path 40 by transistor 48.

In addition to the foregoing components, first end portion 16 can include: open circuit sensor 56 for sensing a break in the conductive (load) path to ground, including a break resulting from the disconnecting of television receiver 14 from cable 13: RF filter 58 for isolating first end portion 16 from the RF signals applied to cable 13 by TV 8-split 46 (see inductor L101 and capacitors C106 and C106A in FIG. 2); and two overcurrent safety (protection) devices, namely, short circuit sensor 60, which is triggered when the current in conductive path 40 exceeds a predetermined level, e.g., 6 amps, and heat sensor 62, which is triggered when the temperature of transistor 48 exceeds a predetermined level, e.g., 138° F. Short circuit sensor 60 and heat sensor 62 are each connected to short circuit timer 64 which causes source voltage switcher 50 to switch transistor 48 into its open state.

Second end portion 18 of the baseband data transfer system includes: (1) DC pass transistor 78, which has an open state in which the flow of DC current through conductive path 42 is interrupted and a closed state in which the flow of DC current is uninterrupted; (2) load current switcher 66, which receives baseband digital bits from remote processor 12 and switches transistor 78 into its open state for the durations of the received bits: (3) interruption sensor 68 which senses interruptions in the flow of DC current through conductive path 42 and generates a baseband digital bit in response to each interruption; and (4) a load, such as, television receiver 14. As discussed in detail below, the operation of load current switcher 66 and interruption sensor 68 are coordinated so that digital bits are not generated on conductor 36 in response to interruptions in conductive path 42 by transistor 78.

Figure 3:
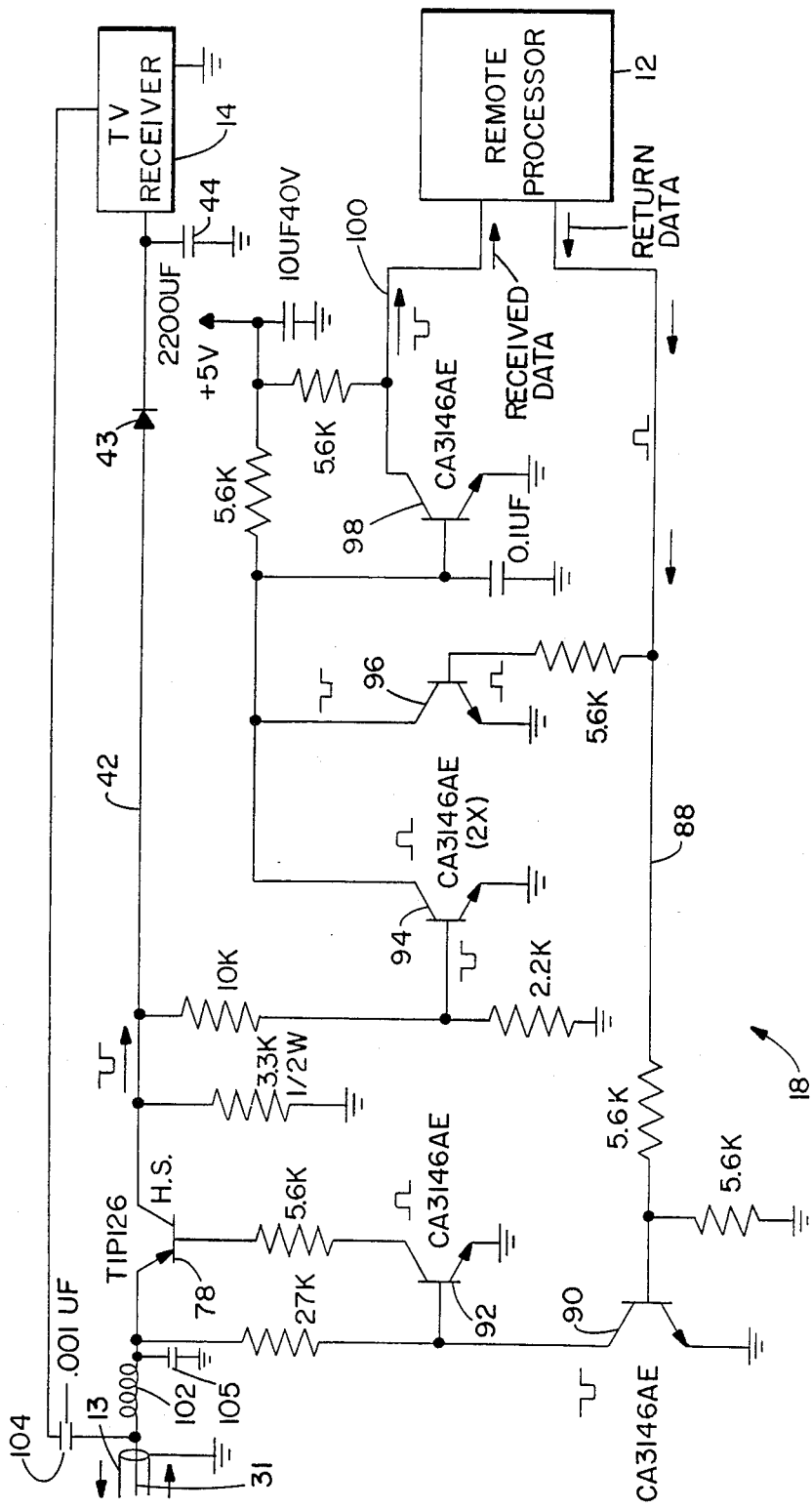
FIG. 3 a circuit diagram showing suitable electronic components which can be used for the second end portion of the baseband digital data transfer system of the present invention.

In addition to the foregoing components, second end portion 18 can include RF filter 70 which passes DC signals to conductor 42 and RF signals to conductor 80 which is connected to the tuner of television receiver 14 (see inductor 102 and capacitors 104 and 105 in FIG. 3). Also, as discussed above, the second end portion can include storage capacitor 44 after diode 43 for providing stored DC current to television receiver 14 when the direct current path from power source 20 has been interrupted by the transmission of baseband digital data through coaxial cable 13.

In operation, central processor 10 causes addressable switches 24 and 28 to switch to a selected (addressed) one of the eight baseband digital data transmission systems. The switching can be performed using switching cable 76 or, depending on the design of the addressable switches, the same conductors used for carrying data to and from the central processor, i.e., conductors 74 and 72, can be used to perform the switching. Suitable components for the addressable switches are a 74LS138 chip for addressable switch 24 and a 74LS251 chip for addressable switch 28.

After the connections between the central processor 10 and first end portion 16 have been established, baseband digital data is transmitted from the central processor to source voltage switcher 50 by means of conductor 74, addressable switch 24, and conductor 26. For each digital bit, the source voltage switcher causes transistor 48 to switch to its open state, thus interrupting the flow of DC current in conductive path 40, central conductor 31 and conductive path 42. This interruption in current flow is sensed by interruption sensor 68 which generates and transmits a baseband digital bit to remote processor 12. In this way, baseband digital bits are transferred from central processor 10 to remote processor 12.

Baseband digital bits are transferred in the reverse direction in a similar manner. In this case, baseband digital data is transmitted from the remote processor to load current switcher 66 by means of conductor 34. For each digital bit, the load current switcher causes transistor 78 to switch to its open state, thus interrupting the flow of DC current in conductive path 42, central conductor 31 and conductive path 40. This interruption in current flow is sensed by interruption sensor 52 and processor 54 which generate and transmit a baseband digital bit to central processor 10 by means of conductor 30, addressable switch 28 and conductor 72.

Since the central processor and the remote processor are connected by a single cable 13, data transfer between the processors must be done serially, i.e., the central processor sends baseband data to the remote processor, followed by the remote processor sending baseband data to the central processor, etc. In general, the central processor will control the flow of data through the cable by sending appropriate control signals to the remote processor, although other traffic controlling approaches can be used if desired.

Figure 2:
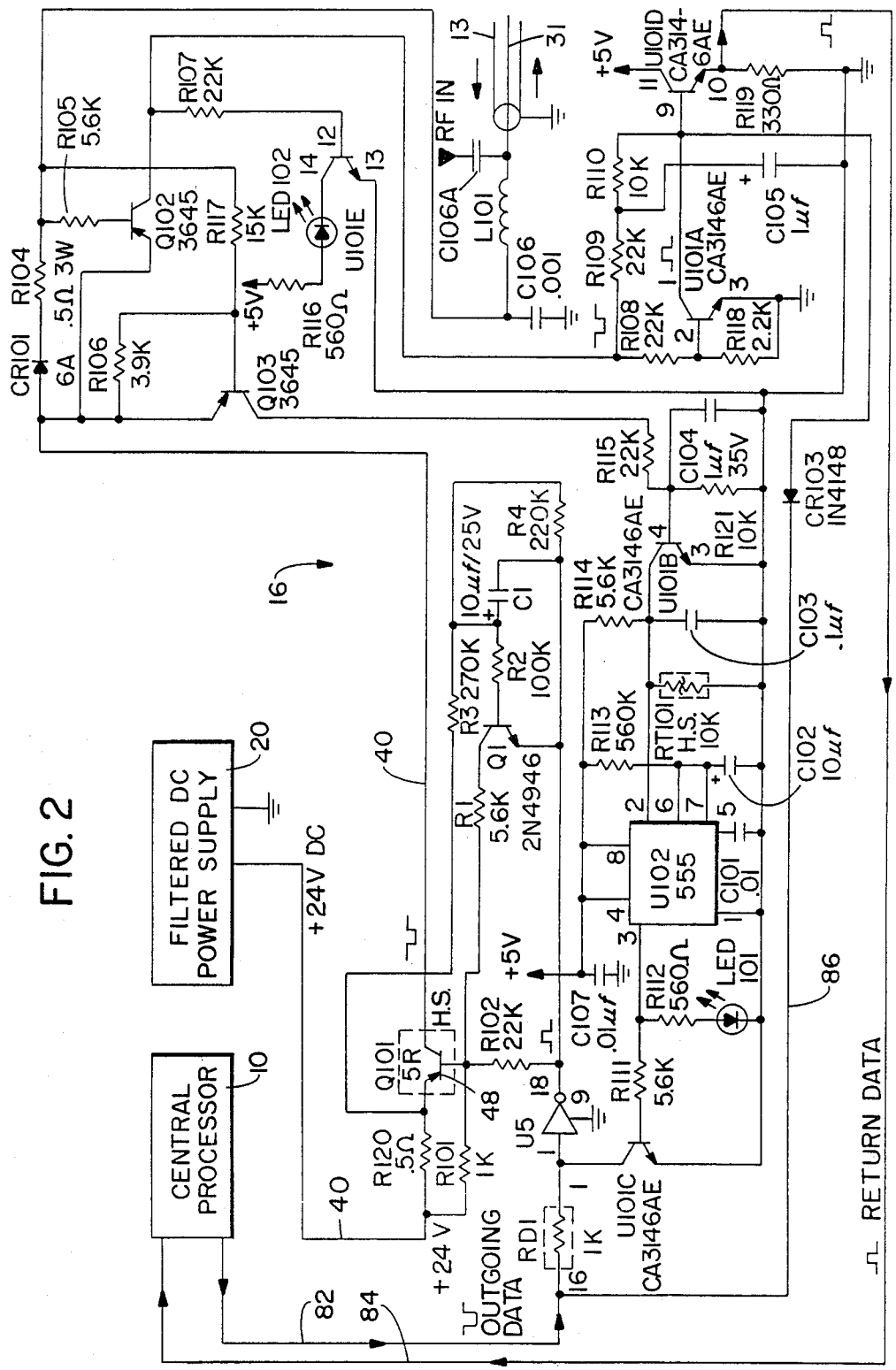
FIG. 2 is a circuit diagram showing suitable electronic components which can be used for the first end portion of the baseband digital data transfer system of the present invention.

Referring now to FIG. 2, this figure shows specific components which can be used to construct first end portion 16. For simplicity of illustration, central processor 10 is shown directly connected to first end portion 16 by conductors 82 and 84.

Conductor 82 is normally high so that inverting buffer U5 pulls the base of PNP transistor Q101 low thus turning on the transistor. Conductor 82 temporarily goes low to transmit a digital bit to first end portion 16. The low state of conductor 82 causes the base of transistor Q101 to go high, thus shutting off the transistor. As discussed in more detail below, the low state of conductor 82 is also transmitted to the base of transistor U101D by conductor 86 to inhibit that transistor from generating a digital bit on conductor 84 in response to the interruption of current flow on conductor 40 caused by the opening of transistor Q101.

The turning off of transistor Q101 produces an interruption in the flow of current through conductor 40, cable 13, and conductor 42 (see FIG. 1) which is sensed by second end portion 18 (see below). Note that a complete cessation of current is not necessary, but rather the current flow only needs to be reduced to a level which will trigger the second end's current interruption sensor.

Interruptions in the flow of current through conductor 40 produced by second end portion 18 are sensed by transistor Q102. Due to the voltage drop across diode CR101 and resistor R104, transistor Q102 is on when current is flowing in conductor 40. Accordingly, capacitor C105 is charged, transistor U101A is on and transistor U101D is off since its base is connected to ground through transistor U101A. When current flow through conductor 40 is temporarily interrupted by second end 18, transistor Q102 temporarily turns off, which temporarily turns off transistor U101A, which causes the base of transistor U101D to temporarily go high, thus temporarily turning on this transistor and producing a digital bit on conductor 84.

As discussed above, digital bits which are transmitted to first end portion 16 by central processor 10 are fed to the base of transistor U101D by conductor 86. These low bits prevent the base of transistor U101D from going high when transistor Q102 turns off in response to the interruption in current flow through conductor 40 caused by transistor Q101 turning off. Accordingly, an outgoing digital bit is not produced on conductor 84 in response to an incoming digital bit on conductor 82.

For an interruption of current through conductor 40 of an extended duration, e.g., because of an open circuit condition in the overall conductive path to ground such as would occur if someone were to remove, e.g., steal, the patient's television set, transistor U101D eventually turns off as capacitor C105 discharges through the base of the transistor U101D and through resistors R110, R119, R109, R108, and R118. The turning off of transistor U101D occurs at a time determined by the time constant of the RC circuit formed by capacitor C105 and resistors R110, R119, R109, R108, and R118. The turning off of this transistor is of value since many central processors and addressable switches are not designed to receive a high input over an extended period of time as would occur if transistor U101D was to remain conductive for the full duration of the open circuit condition.

Transistor Q102, in addition to sensing interruptions in the current flow in conductor 40 produced by second end portion 18, also forms part of the first end portion's open circuit sensor. Specifically, when transistor Q102 is on, i.e., when current is flowing in conductor 40, transistor U101E is on, and thus LED 102 is on. An open circuit condition causes transistors Q102 and U101E to turn off, thus turning off LED 102. LED 102 also turns off each time a digital bit is transmitted through cable 13, but the duration of this turning off is generally too short to be visible.

The short circuit sensor of first end portion 16 comprises one-shot timer U102 and transistors Q103, U101B, and U101C. When the current through diode CR101 and resistor R104 exceeds a predetermined value, e.g., 6 amps, transistor Q103 turns on, which turns on transistor U101B, which triggers timer U102 and causes the output of the timer at pin 3 to go high for a period of time determined by the values of resistor R113 and capacitor C102. The high output from the timer turns on LED 101 and transistor U101C. Transistor U101C connects the input of inverting buffer U5 to ground, which makes the output of the buffer high, thus turning off transistor Q101. Transistor Q101 remains off until timer U102 times out. If the short has been removed, normal operation will then resume. If the short has not been removed, transistor Q103 and thus timer U102 will again turn on to again shut down current flow through the system as a result of transistor Q101 being turned off.

One-shot timer U102 also forms part of the heat sensor of first end portion 16. Specifically, thermistor RT101 is mounted on the heat sink for transistor Q101. When the temperature of transistor Q101 and thus of the heat sink exceeds a threshold temperature, e.g., 138° F., thermistor RT101 becomes sufficiently conductive to trigger timer U102. Once triggered, timer 102 turns off transistor Q101 and turns on LED 101 in the same manner as when triggered by the short circuit sensor.

When transistor Q101 has been off for a substantial period of time, e.g., when it has been shut off by timer U102 or at initial startup, capacitor 44 in second end portion 18 will be at least partially discharged. The charging current flowing into this discharged capacitor may be great enough to trigger the short circuit sensor, i.e., transistor Q103. Accordingly, startup of first end portion 16 may be erratic and the first end portion may not reliably restart after either the short circuit sensor or the heat sensor has been triggered.

To eliminate these possibilities, two paths are used to supply base current to transistor Q101: (1) resistor R102, which is sized so that it does not supply enough base current to fully turn on transistor Q101; and (2) resistor R1 and transistor Q1, which, in combination with resistor R102, do supply enough base current to fully turn on transistor Q101. The base of transistor Q1 is connected to an RC network consisting of resistor R3 and capacitor C1. Accordingly, during restart or initial startup, transistor Q101 is not fully turned on until capacitor C1 has become charged. This arrangement has been found to prevent erroneous triggering of the short circuit sensor due to high charging currents flowing into capacitor 44 upon restart and initial startup.

Referring now to FIG. 3, this figure shows specific components which can be used to construct second end portion 18. Conductor 88 is normally low so that transistor 90 is off, transistor 92 is on, and transistor 78 is on since its base is low. Conductor 88 temporarily goes high to transmit a return digital bit from remote processor 12 to second end portion 18. The high state of conductor 88 causes transistor 90 to turn on, which turns off transistor 92, which causes the base of transistor 78 to go high, thus shutting off transistor 78 and causing an interruption in the flow of current through conductor 42 which is sensed by first end portion 16. As with transistor 48, transistor 78 does not have to completely stop all current flow through conductor 42, but only needs to reduce the current flow to a level which can be sensed by the first end portion.

Interruptions in the flow of current through conductor 42 produced by first end portion 18 are sensed by transistor 94. Transistor 94 is normally on which causes transistor 98 to be normally off, so that conductor 100 is normally high. When current flow through conductor 42 is temporarily interrupted, transistor 94 temporarily turns off, which temporarily turns on transistor 98, which causes conductor 100 to temporarily go low thus transmitting a digital bit to remote processor 12.

Transistor 96 prevents transistor 98 from generating an outgoing digital bit on conductor 100 in response to a return digital bit on conductor 88 from remote processor 12. Specifically, a return digital bit from remote processor 12 on conductor 88 turns on transistor 96 so that transistor 98 remains off even though transistor 94 is turned off by an interruption of current on conductor 42 resulting from the turning off of transistor 78 by the return digital bit.

Although specific embodiments of the invention have been described and illustrated, it is to be understood that modifications can be made without departing from the invention's spirit and scope. For example, components and component configurations other than those shown can be used for each of first end portion 16 and second end portion 18.

What is claimed is:

1. A digital data transfer system comprising:
   (a) a DC voltage source;
   (b) a load;
   (c) a direct current path between the DC voltage source and the load comprising:
      (i) a coaxial cable having a central conductor which includes first and second ends;
      (ii) a first end conductive path for connecting the DC voltage source to the first end of the central conductor; and
      (iii) a second end conductive path for connecting the load to the second end of the central conductor;
   (d) first end switch means in the first end conductive path having an open state in which the flow of DC current from the DC voltage source to the load is interrupted and a closed state in which the flow of DC current is uninterrupted;
   (e) first end bit receiving means for receiving a digital bit from a first source of such bits external to the digital data transfer system and for switching the first end switch means into its open state for a period of time corresponding to the duration of the bit;
   (f) second end switch means in the second end conductive path having an open state in which the flow of DC current from the DC voltage source to the load is interrupted and a closed state in which the flow of DC current is uninterrupted;
   (g) second end bit receiving means for receiving a digital bit from a second source of such bits external to the digital data transfer system and for switching the second end switch means into its open state for a period of time corresponding to the duration of the bit;
   (h) first end bit generating means for sensing an interruption in the flow of DC current through the first end conductive path produced by the second end switch means and generating a digital bit in response thereto; and
   (i) second end bit generating means for sensing an interruption in the flow of DC current through the second end conductive path produced by the first end switch means and generating a digital bit in response thereto.

2. The system of claim 1 further including:
   (a) first end means for preventing the first end bit generating means from generating a digital bit in response to an interruption of the first end conductive path caused by the first end bit receiving means switching the first end switch means into its open state; and
   (b) second end means for preventing the second end bit generating means from generating a digital bit in response to an interruption of the second end conductive path caused by the second end bit receiving means switching the second end switch means into its open state.

3. The system of claim 1 further including means for detecting the current flowing through the first end conductive path and switching the first end switch means into its open state when the current exceeds a predetermined level.

4. The system of claim 3 further including:
   (a) a DC storage capacitor in parallel with the load; and
   (b) means for limiting the inrush current flowing through the first end conductive path to charge the DC storage capacitor so that the current is less than the predetermined level.

5. The system of claim 4 wherein the first end switch means is a transistor and the means for limiting the inrush current comprises means for controlling the transistor's base current.

6. The system of claim 1 further including means for sensing the temperature of the first end switch means and for switching the first end switch means into its open state when the temperature is above a predetermined value.

7. The system of claim 1 further including means for providing a visual indication of an open circuit in the direct current path.

8. The system of claim 1 wherein the load comprises a television receiver, the power source for the television receiver is the DC power source, the first end conductive path is connected to the first end of the central conductor through an RF filter, the second end conductive path is connected to the second end of the central conductor through an RF filter, and wherein the system includes:
   (a) a DC storage capacitor in parallel with the load;
   (b) means for applying RF signals to the first end of the central conductor; and
   (c) means for conducting RF signals from the second end of the central conductor to an RF signal tuner associated with the television receiver.

9. The system of claim 1 further including:
   (a) first end means for preventing the first end bit generating means from generating a digital bit in response to an interruption of the first end conductive path caused by the first end bit receiving means switching the first end switch means into its open state;

(b) second end means for preventing the second end bit generating means from generating a digital bit in response to an interruption of the second end conductive path caused by the second end bit receiving means switching the second end switch means into its open state;

(c) means for detecting the current flowing through the first end conductive path and switching the first end switch means into its open state when the current exceeds a predetermined level;

(d) a DC storage capacitor in parallel with the load; and (e) means for limiting the inrush current flowing through the first end conductive path to charge the DC storage capacitor so that the current is less than the predetermined level.

10. The system of claim 9 wherein the first end switch means is a transistor and the means for limiting the inrush current comprises means for controlling the transistor's base current.

11. The system of claim 9 further including means for sensing the temperature of the first end switch means and for switching the first end switch means into its open state when the temperature is above a predetermined value.

12. The system of claim 9 further including means for providing a visual indication of an open circuit in the direct current path.

13. The system of claim 9 wherein the load comprises a television receiver, the power source for the television receiver is the DC power source, the first end conductive path is connected to the first end of the central conductor through an RF filter, the second end conductive path is connected to the second end of the central conductor through an RF filter, and wherein the system includes:

(a) means for applying RF signals to the first end of the central conductor; and (b) means for conducting RF signals from the second end of the central conductor to an RF signal tuner associated with the television receiver.

14. A digital data distribution and processing system comprising:

(a) a plurality of digital data transfer systems according to claim 1;

(b) a central digital data processor for generating and receiving digital bits, said central processor comprising the first source of digital bits for each of the plurality of digital data transfer systems;

(c) a plurality of remote digital data processors for generating and receiving digital bits, one remote processor being associated with each of the plurality of digital data transfer systems, said one remote processor comprising the second source of digital bits for the digital data transfer system with which that remote processor is associated;

(d) for each remote digital data processor, means for operatively connecting said processor to the second end bit generating means and the second end bit receiving means of its associated digital data transfer system; and (e) addressable switch means for operatively connecting the central processor to the first end bit generating means and the first end bit receiving means of any selected one of the plurality of digital data transfers systems to thereby permit digital data transfer between the central processor and any of the remote processors.

15. The system of claim 14 wherein a common DC voltage source is used for at least two of the plurality of digital data transfer systems.

16. The system of claim 14 wherein each of the plurality of digital data transfer systems includes:

(a) first end means for preventing the first end bit generating means from generating a digital bit in response to an interruption of the first end conductive path caused by the first end bit receiving means switching the first end switch means into its open state;

(b) second end means for preventing the second end bit generating means from generating a digital bit in response to an interruption of the second end conductive path caused by the second end bit receiving means switching the second end switch means into its open state;

(c) means for detecting the current flowing through the first end conductive path and switching the first end switch means into its open state when the current exceeds a predetermined level;

(d) a DC storage capacitor in parallel with the load; and (e) means for limiting the inrush current flowing through the first end conductive path to charge the DC storage capacitor so that the current is less than the predetermined level.

17. The system of claim 16 wherein for each of the plurality of digital data transfer systems, the first end switch means is a transistor and the means for limiting the inrush current comprises means for controlling the transistor's base current.

18. The system of claim 16 wherein each of the plurality of digital data transfer systems further includes means for sensing the temperature of the first end switch means and for switching the first end switch means into its open state when the temperature is above a predetermined value.

19. The system of claim 16 wherein each of the plurality of digital data transfer systems further includes means for providing a visual indication of an open circuit in the direct current path.

20. The system of claim 16 wherein for each of the plurality of digital data transfer systems, the load comprises a television receiver, the power source for the television receiver is the digital data transfer system's DC power source, the first end conductive path is connected to the first end of the central conductor through an RF filter, the second end conductive path is connected to the second end of the central conductor through an RF filter, and wherein each of the plurality of digital data transfer systems includes:

(a) means for applying RF signals to the first end of the central conductor; and (b) means for conducting RF signals from the second end of the central conductor to an RF signal tuner associated with the television receiver.

21. A method for the bi-directional, serial transfer of baseband digital data on a single coaxial cable which provides DC power to the power input of a television receiver and RF signal to an RF tuner associated with the television receiver, comprising the steps of:

(a) connecting a DC voltage source and a RF signal source to a first end of the cable;

(b) connecting a second end of the cable to (i) a television receiver's power input, (ii) said television receiver's RF tuner, and (iii) a DC storage capacitor;

(c) for each digital bit which is to be sent from the first end to the second end;
  (i) temporarily disconnecting the DC voltage source from the first end of the cable so as to temporarily interrupt the flow of DC current, but not RF signals, down the cable, said interruption in the flow of DC current down the cable comprising the digital bit; and
  (ii) sensing the interruption in the flow of DC current down the cable at the second end; and (d) for each digital bit which is to be sent from the second end to the first end;
  (i) temporarily disconnecting the second end of the cable from the power input to the television receiver and the DC storage capacitor, but not from the RF tuner, so as to temporarily interrupt the flow of DC current down the cable, said interruption in the flow of DC current down the cable comprising the digital bit; and
  (ii) sensing the interruption in the flow of DC current down the cable at the first end.

* * * * *